(12) United States Patent
Nishimura et al.

(10) Patent No.: US 11,525,411 B2
(45) Date of Patent: *Dec. 13, 2022

(54) ENGINE

(71) Applicant: Yanmar Power Technology Co., Ltd., Osaka (JP)

(72) Inventors: Katsuhiro Nishimura, Osaka (JP); Koichi Hirose, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,966

(22) Filed: Dec. 27, 2021

(65) Prior Publication Data

US 2022/0120226 A1 Apr. 21, 2022

Related U.S. Application Data

(63) Continuation of application No. 17/158,749, filed on Jan. 26, 2021, now Pat. No. 11,248,541, which is a
(Continued)

(30) Foreign Application Priority Data

Jul. 14, 2016 (JP) .............................. JP2016-139440

(51) Int. Cl.
*F02D 19/06* (2006.01)
*F02M 61/04* (2006.01)
(Continued)

(52) U.S. Cl.
CPC ............ *F02D 19/061* (2013.01); *F02B 67/00* (2013.01); *F02D 19/06* (2013.01);
(Continued)

(58) Field of Classification Search
CPC .... F02D 19/061; F02D 19/06; F02D 19/0613; F02D 19/0642; F02D 19/0673; F02D 19/082; F02B 67/00; F02M 37/0047; F02M 37/00; F02M 55/02; F02M 55/025; F02M 61/04; F02M 61/14; Y02T 10/12; Y02T 10/30
(Continued)

(56) References Cited

U.S. PATENT DOCUMENTS 9,546,615 B2 * 1/2017 Melnyk ................ F02D 19/081
9,903,324 B2 * 2/2018 Nishimura ........... F02M 21/029
(Continued)

*Primary Examiner* — Hai H Huynh
(74) *Attorney, Agent, or Firm* — Chris Mizumoto

(57) ABSTRACT

An engine including a main fuel injection valve, a pilot fuel injection valve, a liquid fuel supply rail pipe, and a pilot fuel supply rail pipe. The main fuel injection valve supplies liquid fuel from the liquid fuel supply rail pipe to a combustion chamber during combustion in a diffusion combustion system. The pilot fuel injection valve supplies pilot fuel from the pilot fuel supply rail pipe to the combustion chamber in order to ignite gaseous fuel during combustion in a premixed combustion system. The liquid fuel supply rail pipe is disposed at one side of an imaginary vertical plane including an axis of a crank shaft. The pilot fuel supply rail pipe is disposed at the side of the imaginary vertical plane at which the liquid fuel supply rail pipe is disposed.

3 Claims, 10 Drawing Sheets

Related U.S. Application Data continuation of application No. 16/316,762, filed as application No. PCT/JP2017/021521 on Jun. 9, 2017, now Pat. No. 10,941,714.

(51) Int. Cl.
*F02M 61/14* (2006.01)
*F02M 37/00* (2006.01)
*F02M 55/02* (2006.01)
*F02B 67/00* (2006.01)
*F02D 19/08* (2006.01)

(52) U.S. Cl.
CPC ..... *F02D 19/0613* (2013.01); *F02D 19/0642* (2013.01); *F02D 19/0673* (2013.01); *F02D 19/082* (2013.01); *F02M 37/00* (2013.01); *F02M 37/0047* (2013.01); *F02M 55/02* (2013.01); *F02M 55/025* (2013.01); *F02M 61/04* (2013.01); *F02M 61/14* (2013.01); *Y02T 10/12* (2013.01); *Y02T 10/30* (2013.01)

(58) Field of Classification Search
USPC ... 123/27 GE, 456, 457, 468, 469, 514, 515, 123/525, 575, 299
See application file for complete search history.

(56) References Cited

U.S. PATENT DOCUMENTS

| | | | | |
|---|---|---|---|---|
| 10,393,035 B2* | 8/2019 | Hagiwara | ........... | F02D 41/3094 |
| 10,941,714 B2* | 3/2021 | Nishimura | ............ | F02D 19/105 |
| 11,248,541 B2* | 2/2022 | Nishimura | ............. | F02M 61/04 |

* cited by examiner

ENGINE

CROSS-REFERENCE

This application is a continuation of U.S. application Ser. No.: 17/158,749 filed Jan. 26, 2021, which is a continuation of a US National Stage Application under 35 U.S.C. §371, U.S. application Ser. No. 16/316,762 filed Jan. 10, 2019, of International Application No. PCT/JP2017/021521 filed Jun. 9. 2017, which. claims foreign priority of JP2016-139440 filed Jul. 14, 2016, all the disclosures of which are hereby incorporated by reference in their entirety.

TECHNICAL FIELD

The present invention relates to an engine employing multiple types of fuel. Specifically, the present invention relates to arrangement of pipes for supplying liquid fuel in an engine.

BACKGROUND ART

A known so-called dual fuel engine is capable of being driven while selecting one of a premixed combustion system in which fuel gas such as natural gas is mixed with air for combustion and a diffusion combustion system in which liquid fuel (fuel oil) such as heavy oil is diffused for combustion. Patent Literature 1 (PTL 1) discloses an engine device that is an engine of this type.

In the engine device of PTL 1, a liquid fuel supply rail pipe for supplying liquid fuel to combustion chambers during combustion in the diffusion combustion system is disposed at the right of a crank shaft serving as an engine output shaft. On the other hand, a common rail pipe for supplying pilot fuel to the combustion chambers in order to ignite gaseous fuel during combustion in the premixed combustion system is disposed at the left of the crank shaft and immediately at a side of an exhaust manifold in plan view, specifically, above an exhaust branch pipe of the exhaust manifold.

CITATION LIST

Patent Literature

PTL 1: Japanese Patent Application Laid-Open No. 2015-86728

SUMMARY OF INVENTION

Technical Problem

In the configuration of PTL 1, however, the liquid fuel supply rail pipe is located at the right of the crank shaft and the pilot fuel supply common rail pipe is located at the left of the crank shaft. Thus, it is difficult to perform maintenance of these rail pipes from a common place, and this causes a decrease in working efficiency.

Some aspects of the present invention have been made in view of the foregoing circumstances, and have a latent purpose of easing maintenance of a liquid fuel supply rail pipe and a pilot fuel supply rail pipe.

Solution to Problem and Advantages

Problems to be solved by the invention are as described above, and next, means for solving the problems and advantages thereof will be described.

In an aspect of the invention, an engine having the following configuration is provided. That is, the engine is operable in a premixed combustion system in which gaseous fuel mixed with air is caused to flow into combustion chambers and a diffusion combustion system that injects liquid fuel into the combustion chambers for combustion. The engine includes a main fuel injection valve, a pilot fuel injection valve, a liquid fuel supply rail pipe, and a pilot fuel supply rail pipe. The main fuel injection valve supplies liquid fuel to the combustion chamber during combustion in the diffusion combustion system. The pilot fuel injection valve supplies pilot fuel to the combustion chamber in order to ignite gaseous fuel during combustion in the premixed combustion system. The liquid fuel supply rail pipe is disposed at one side of an imaginary vertical plane including a crank shaft of the engine and supplies liquid fuel to the main fuel injection valve. The pilot fuel supply rail pipe is disposed at the side of the imaginary vertical plane at which the liquid fuel supply rail pipe is disposed and supplies pilot fuel to the pilot fuel injection valve. The pilot fuel supply rail pipe is disposed above the liquid fuel supply rail pipe. The liquid fuel supply rail pipe and the pilot fuel supply rail pipe are disposed in a direction parallel to an axis of the crank shaft.

Accordingly, maintenance of the liquid fuel supply rail pipe and maintenance of the pilot fuel supply rail pipe can be performed from one side of the crank shaft of the engine, and thus, maintenance can be performed easily.

In the engine, an exhaust manifold that collects exhaust air generated by combustion in the combustion chamber to emit the air to outside is preferably disposed at a side of the imaginary vertical plane opposite to the side at which the liquid fuel supply rail pipe is disposed.

Accordingly, the exhaust manifold is disposed at the side of the crank shaft opposite to the side at which the liquid fuel supply rail pipe and the pilot fuel supply rail pipe are disposed. Thus, in a case where fuel yet to be supplied to the combustion chamber leaks, a risk of fire due to contact of the fuel with the surface of the high-temperature exhaust manifold can be eliminated or reduced.

The engine preferably has the configuration as follows. Specifically, the engine further includes a fuel injection pump and a covering member. The fuel injection pump is disposed at the side of the imaginary vertical plane at which the liquid fuel supply rail pipe is disposed and supplies fuel to the main fuel injection valve. The covering member covers the liquid fuel supply rail pipe, the pilot fuel supply rail pipe, and the fuel injection pump.

Accordingly, even if fuel leaks from one of the liquid fuel supply rail pipe, the pilot fuel supply rail pipe, and the fuel injection pump, scattering of fuel can be prevented or reduced, and thus, maintainability and safety can be enhanced.

The engine preferably has the following configuration. Specifically, the engine includes a pilot fuel supply main pipe, a liquid fuel suppl main pipe, and a fuel return pipe. Fuel to be sent to the pilot fuel supply rail pipe flows by way of the pilot fuel supply main pipe. Fuel to be sent to the liquid fuel supply rail pipe flows by way of the liquid fuel supply main pipe. The fuel return pipe returns redundant fuel from a fuel injection pump that supplies fuel to the main fuel injection valve. The pilot fuel supply main pipe, the liquid fuel supply main pipe, and the fuel return pipe extend in a top-bottom direction through a clamp member.

The engine preferably has the following configuration. Specifically, the engine includes an upper stay and a lower stay. The upper stay is fixed to a cylinder head. The lower stay is fixed to a cylinder block. The pilot fuel supply rail pipe is supported by the upper stay and the lower stay.

DESCRIPTION OF EMBODIMENTS

Figure 1:
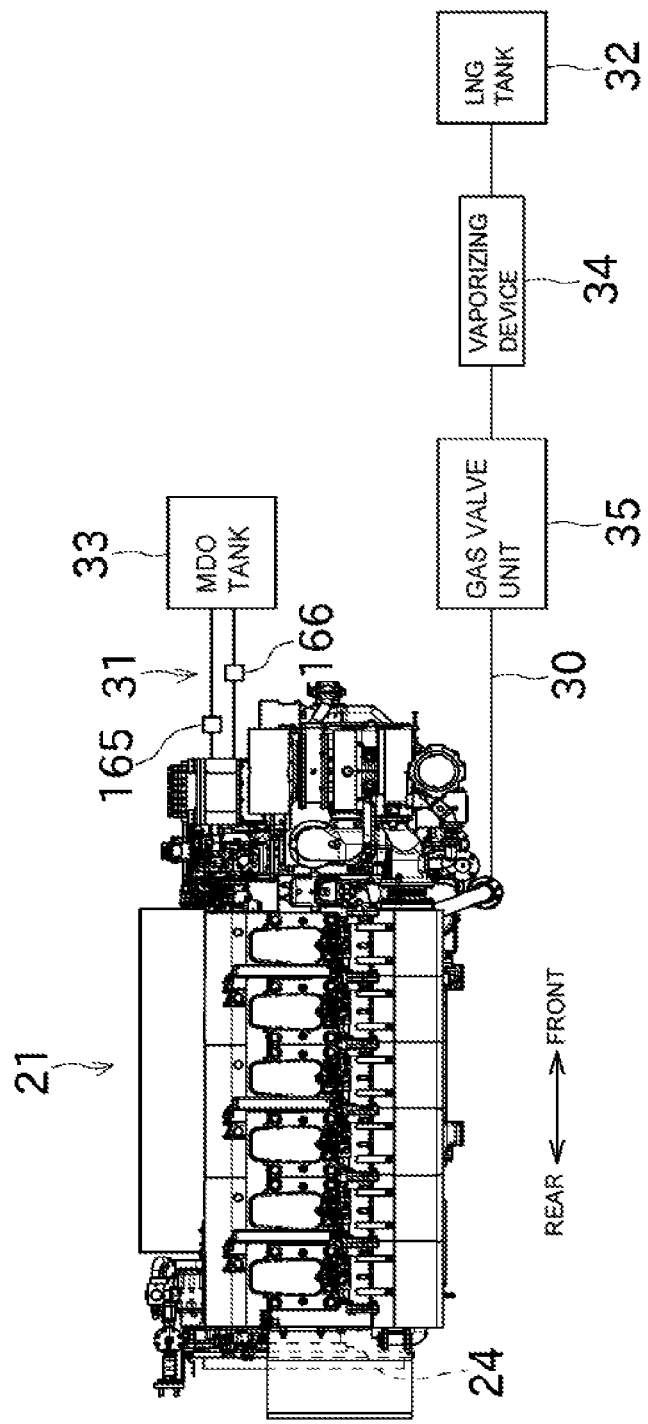
FIG. 1 A view schematically illustrating an engine and fuel supply paths of two systems according to one embodiment of the present disclosure.
Figure 2:
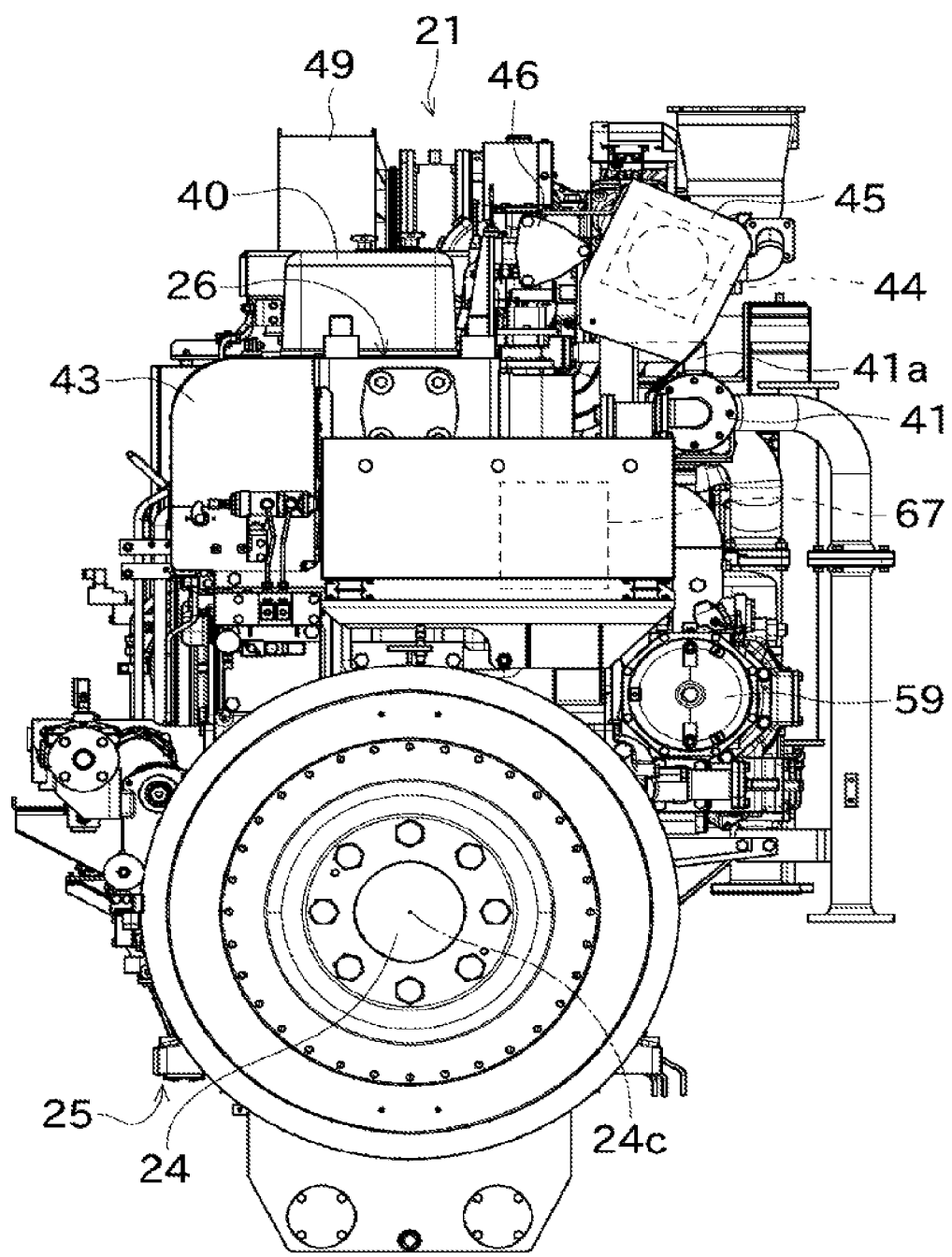
FIG. 2 A rear view of the engine.
Figure 3:
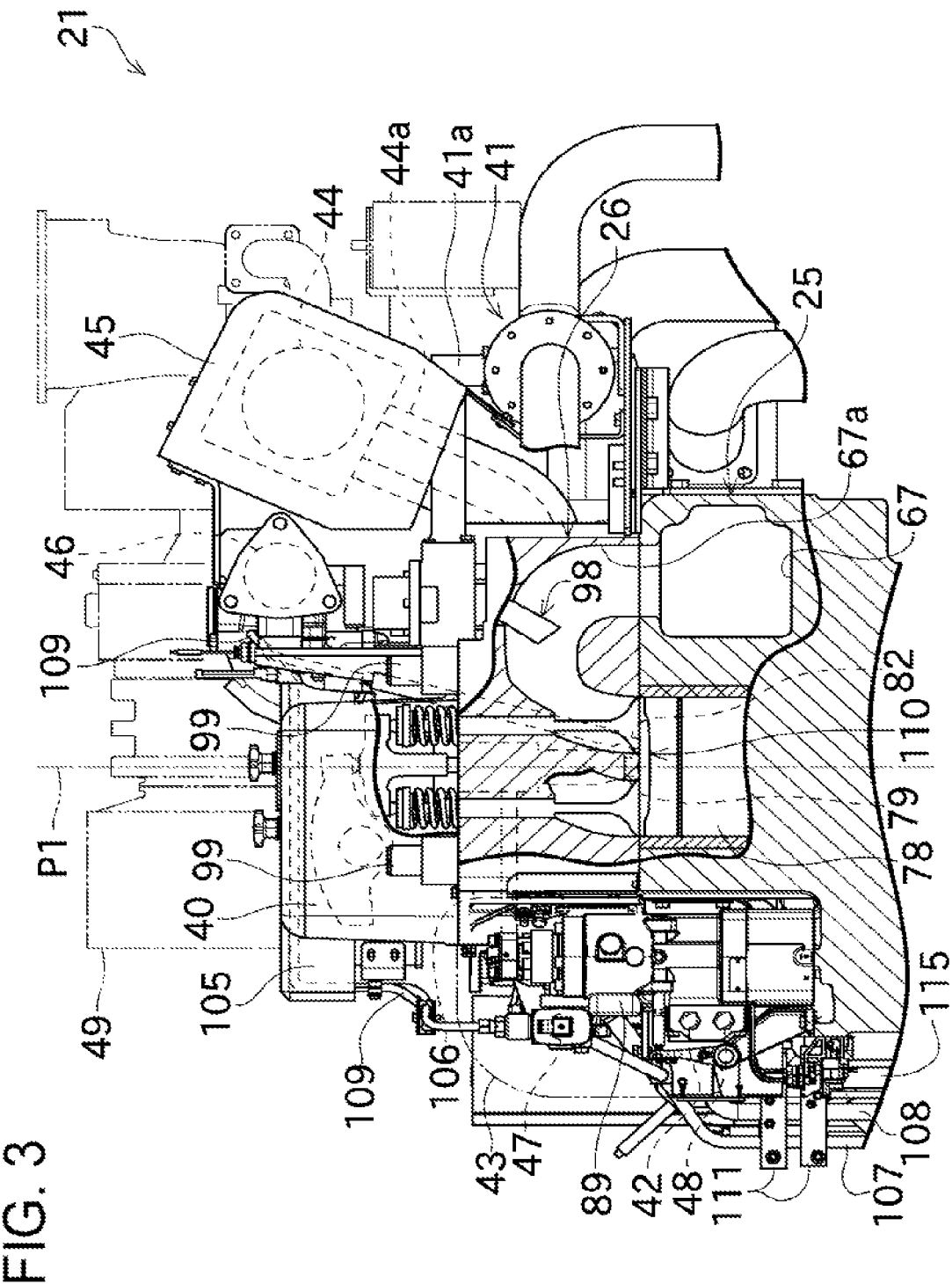
FIG. 3 A partial rear cross-sectional view illustrating a configuration around a combustion chamber in detail.
Figure 4:
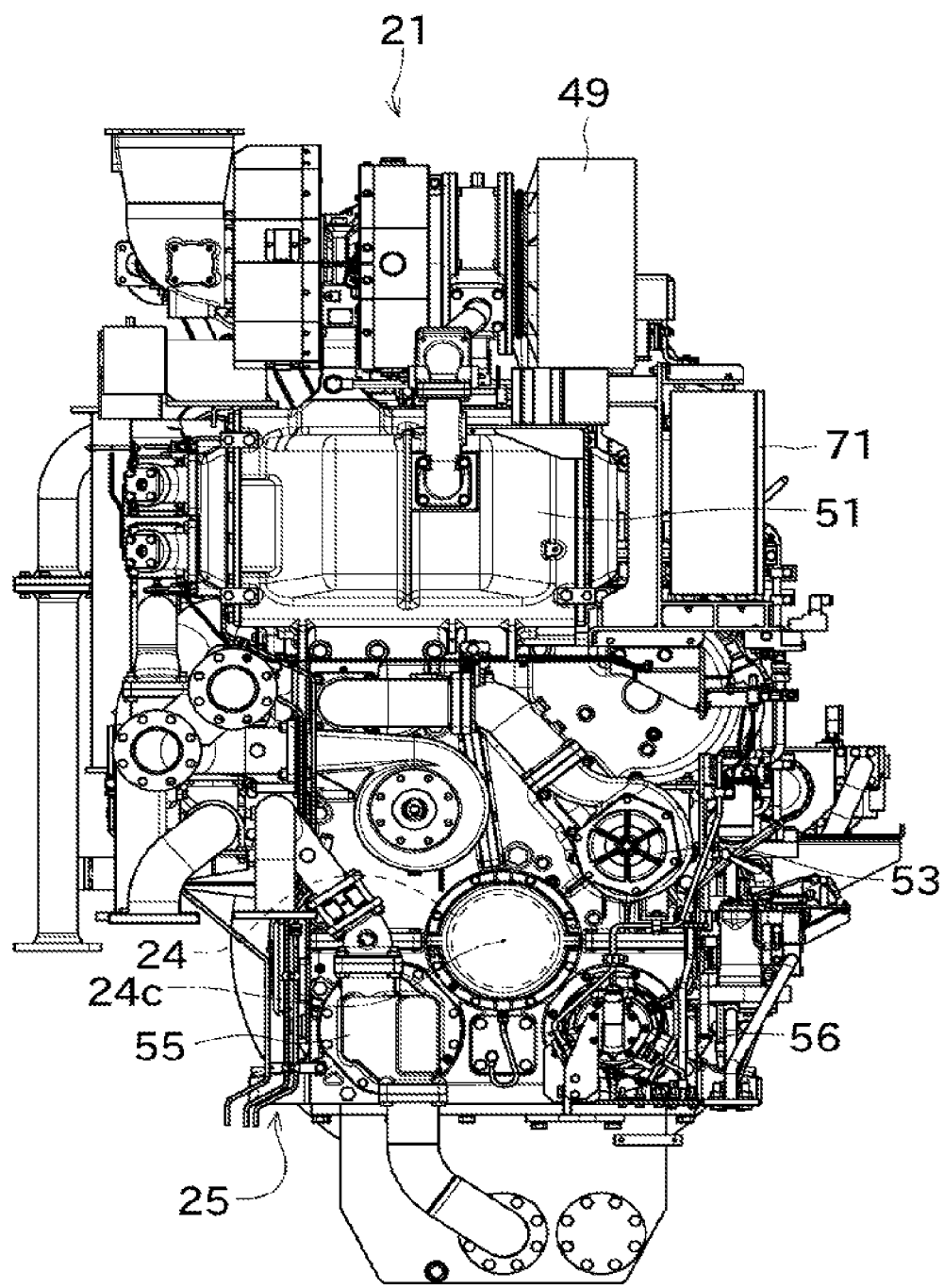
FIG. 4 A front view of the engine.
Figure 5:
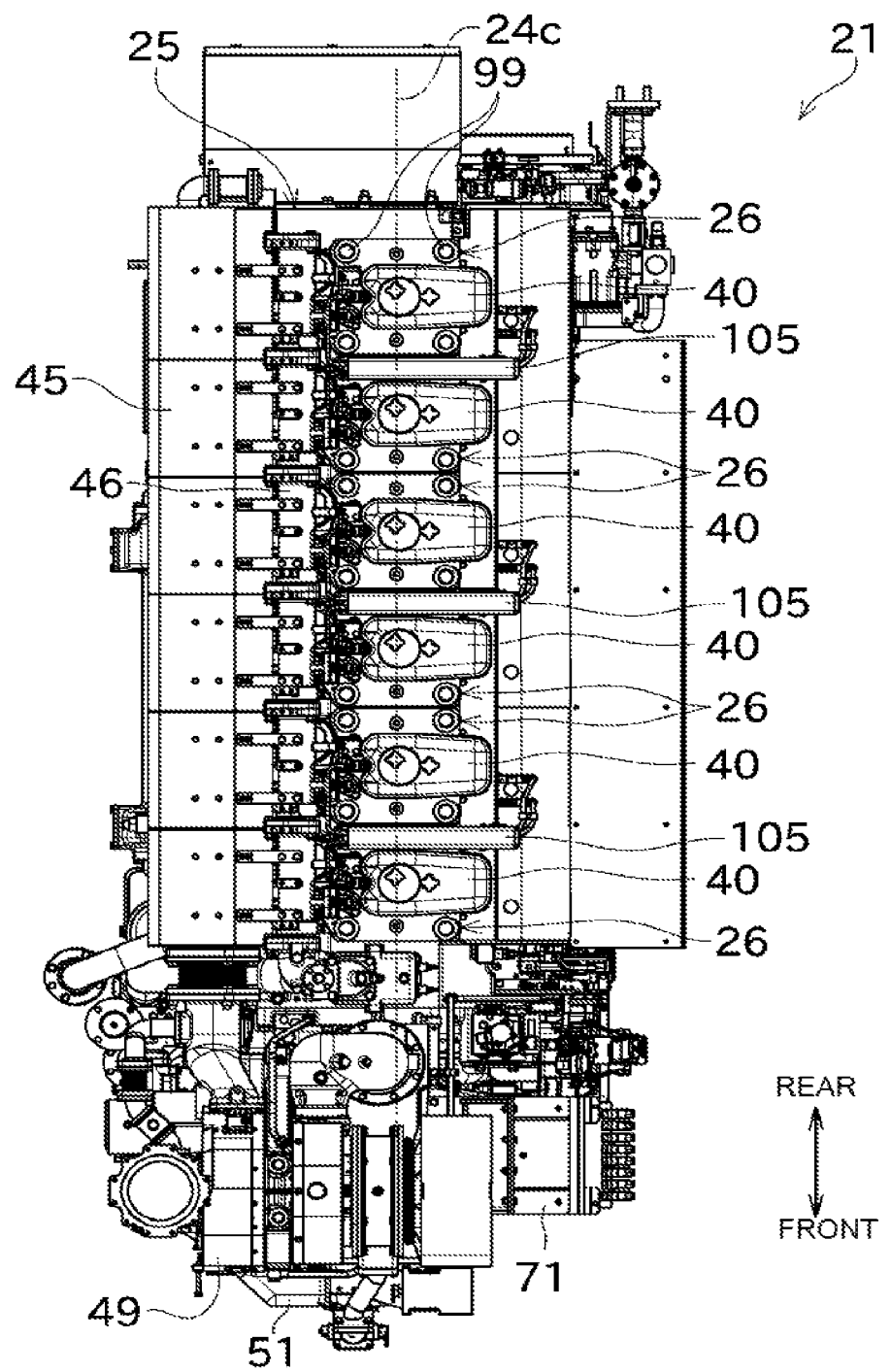
FIG. 5 A plan view of the engine.
Figure 6:
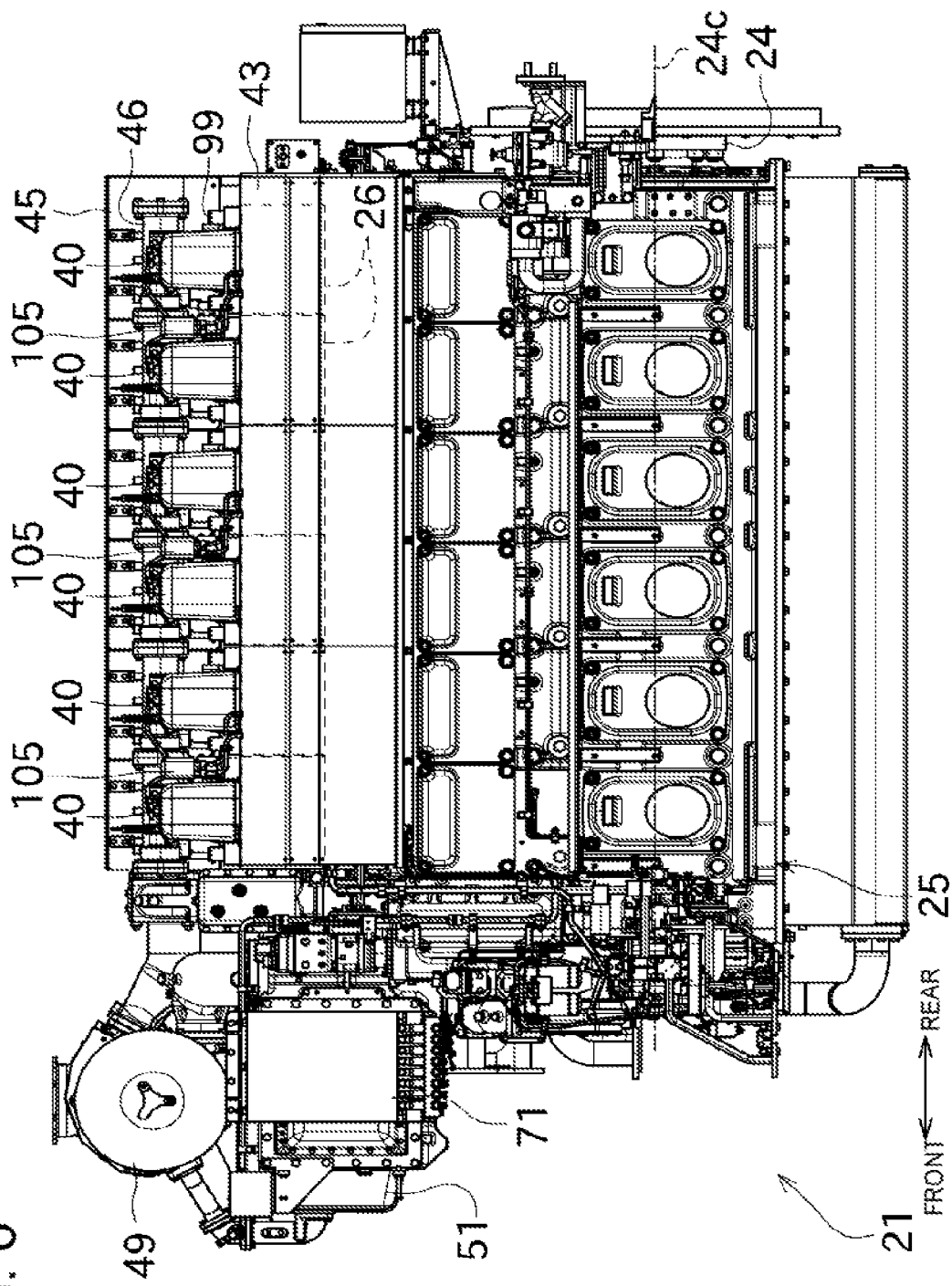
FIG. 6 A right side view of the engine.
Figure 7:
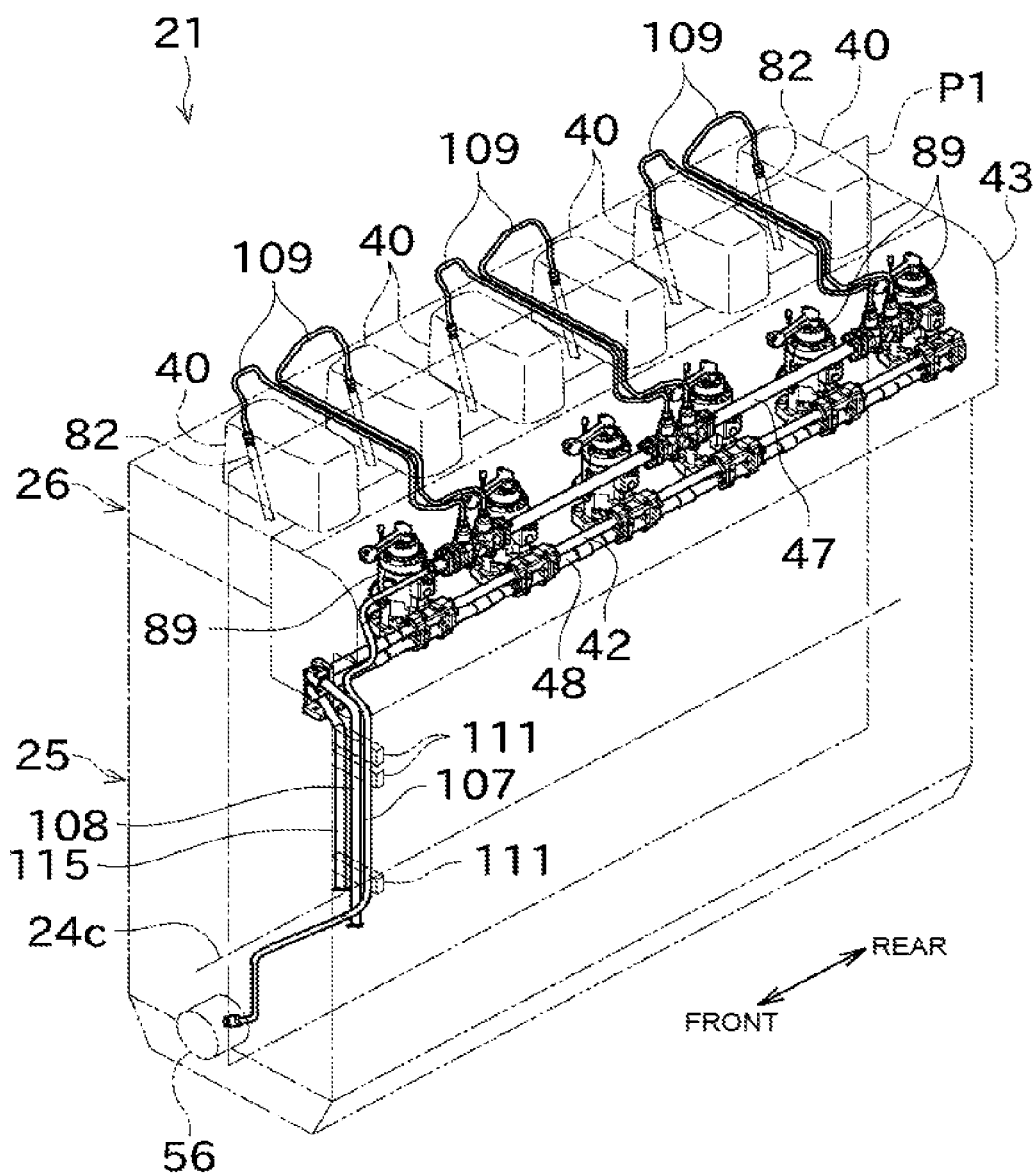
FIG. 7 A schematic front perspective view illustrating a liquid fuel supply path.
Figure 8:
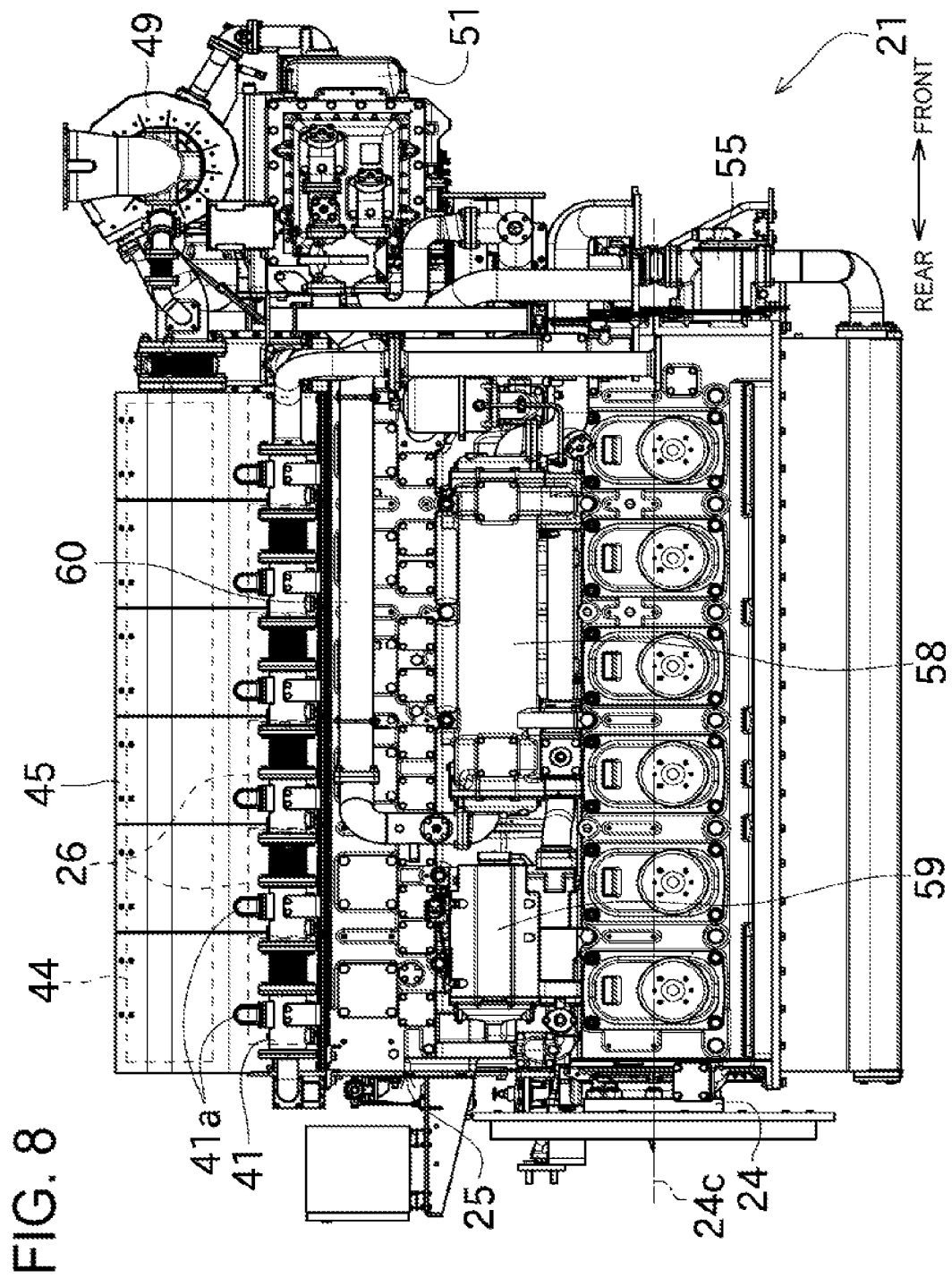
FIG. 8 A left side view of the engine.
Figure 9:
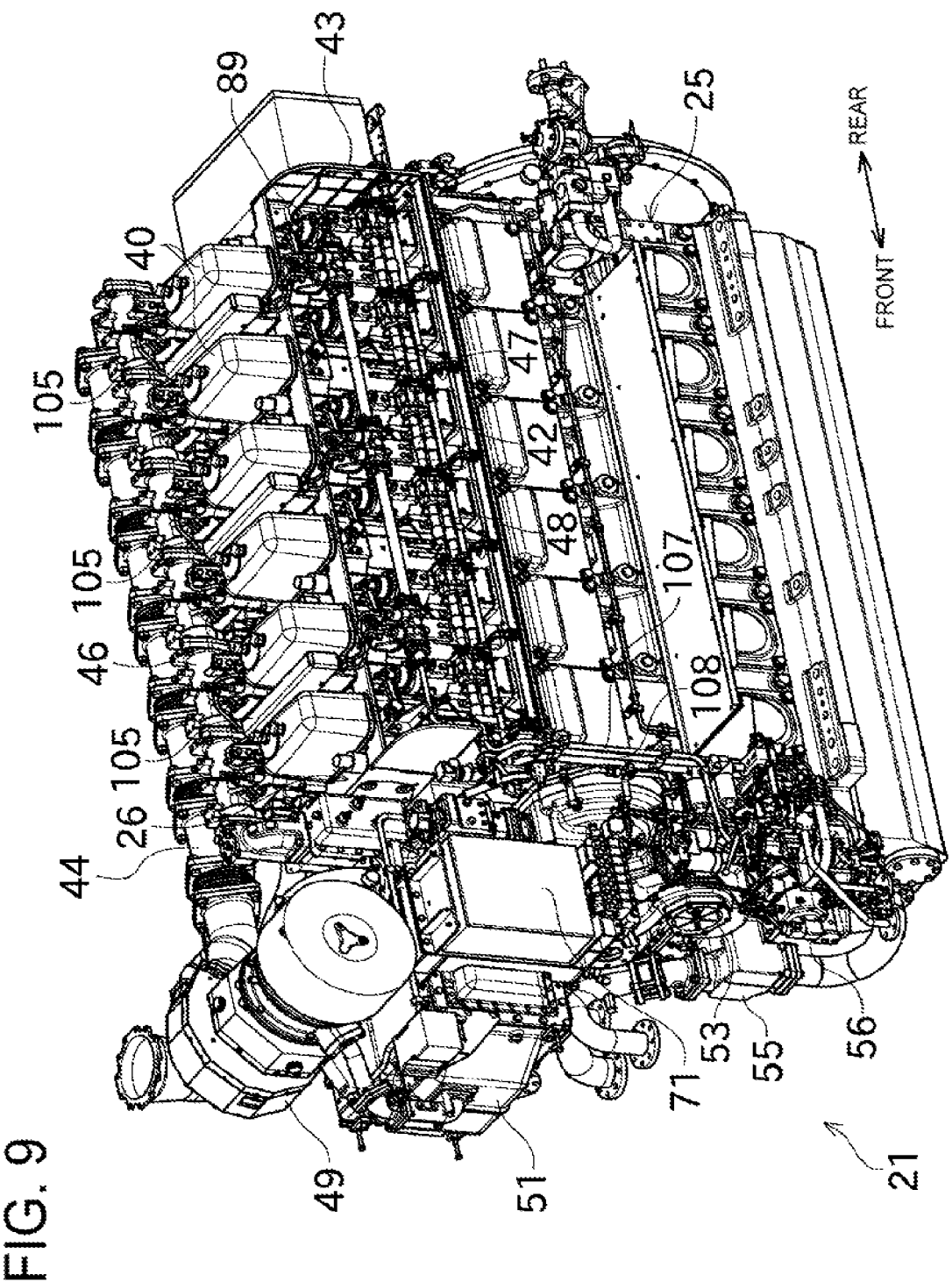
FIG. 9 A perspective view of the engine illustrating a state where a part of a side cover and a heat shielding cover are detached.

An embodiment of the present disclosure will be described with reference to the drawings. FIG. 1 is a view schematically illustrating an engine 21 and fuel supply paths 30 and 31 of two systems according to one embodiment of the present disclosure. FIG. 2 is a rear view of the engine 21. FIG. 3 is a partial rear cross-sectional view illustrating a configuration around a combustion chamber 110 in detail. FIG. 4 is a front view of the engine 21. FIG. 5 is a plan view of the engine 21. FIG. 6 is a right side view of the engine 21. FIG. 7 is a schematic front perspective view illustrating a liquid fuel supply path. FIG. 8 is a left side view of the engine 21. FIG. 9 is a perspective view of the engine 21 illustrating a state where a part of a side cover 43 and a heat shielding cover 45 are detached.

The engine (multi-cylinder engine) 21 according to this embodiment illustrated in FIG. 1 is a so-called dual fuel engine operable in both a premixed combustion system in which gaseous fuel mixed with air is caused to flow into combustion chambers and a diffusion combustion system that injects liquid fuel into combustion chambers for combustion. The engine 21 according to this embodiment serves as a driving source of a propulsive and power generating mechanism of an unillustrated ship and is mounted to an inner bottom plate of an engine room of the ship with a base interposed therebetween.

A crank shaft 24 serving as an engine output shaft projects rearward from a rear end of the engine 21. An unillustrated speed-reducer is coupled to one end of the crank shaft 24 to enable power transfer. The speed reducer is sandwiched between the crank shaft 24 and an unillustrated propeller shaft of the ship, and the propeller shaft is disposed coaxially with the crank shaft 24. A propeller for generating propulsive power of the ship is attached to an end of the propeller shaft. The speed-reducer includes a PTO shaft, and an unillustrated shaft-driving power generator is coupled to the PTO shaft to enable power transfer.

This configuration enables a driving force of the engine 21 to be branched into the propeller shaft and the shaft-driving power generator and transferred through the speed-reducer. Accordingly, propulsive power of the ship is generated, and electric power generated by driving of the shaft-driving power generator is supplied to electric circuits in the ship.

Next, the engine 21 will be described in detail with reference to the drawings. The engine 21 is a dual fuel engine as described above, and can be driven while selecting one of a premixed combustion system in which fuel gas such as natural gas is mixed with the air for combustion and a diffusion combustion system in which liquid fuel (fuel oil) such as heavy oil is diffused for combustion.

Positional relationship among the front, rear, left, and right in the configuration of the engine 21 will be described below with a side connected to the speed-reducer (a side where a flywheel is disposed) being defined as rear, a right side toward the front surface of the engine 21 being defined as right, a let side toward the front surface of the engine 21 being defined as left. Thus, the front-rear direction (longitudinal direction) can be a direction parallel to the axis of the crank shaft 24, and the left-right direction (lateral direction) can be a direction perpendicular to the axis of the crank shaft 24. It should be noted that this description is not intended to limit the orientation of the engine 21, and the engine 21 can be placed in various orientations in accordance with application and others.

As illustrated in FIG. 1, the fuel supply paths of two systems 30 and 31 are connected to the engine 21. A gaseous fuel tank 32 for storing liquefied natural gas (LNG) is connected to one fuel supply path 30, whereas a liquid fuel tank 33 for storing marine diesel oil (MDO) is connected to the other fuel supply path 31. In this configuration, the fuel supply path 30 supplies fuel gas to the engine 21, and the fuel supply path 31 supplies fuel oil to the engine 21.

In the fuel supply path 30, a gaseous fuel tank 32 that stores gaseous fuel in a liquefied state, a vaporizing device 34 that vaporizes the liquefied fuel in the gaseous fuel tank 32, and a gas valve unit 35 that adjusts the supply rate of fuel gas from the vaporizing device 34 to the engine 21, are arranged in this order from the upstream side.

As illustrated in FIGS. 2 through 4, the engine 21 is an in-line multi-cylinder engine configured by mounting cylinder heads 26 onto a cylinder block 25. The crank shaft 24 is rotatably supported on a lower portion of the cylinder block 25 with an axis 24c oriented in the front-rear direction as illustrated FIGS. 2 and 4.

In the cylinder block 25, a plurality of (six in this embodiment) cylinders are arranged in a line (in series) along the axis of the crank shaft 24. As illustrated in FIG. 3, each cylinder houses a piston 78 such that the pistons 78 are slidable in the top-bottom direction. This piston 78 is coupled to the crank shaft 24 through an unillustrated rod.

As illustrated in FIGS. 5 and 6, the plurality of (six in this embodiment) cylinder heads 26 are attached to the cylinder block 25 to cover the cylinders individually from above. The cylinder heads 26 are provided to the individual cylinders, and are fixed to the cylinder block 25 using head bolts 99. As illustrated in FIG. 3, in each cylinder, the combustion chamber 110 is defined in space surrounded by the upper surface of the piston 78 and the cylinder head 26.

As illustrated in FIG. 5, a plurality of head covers 40 correspond to the individual cylinders and are arranged on the cylinder heads 26 in a line along the direction of the axis 24c of the crank shaft 24 (front-rear direction). As illustrated in FIG. 3, each of the head covers 40 houses a valve mechanism constituted by a push rod, a rocker arm, and so forth in order to operate an intake valve and an exhaust valve. In a state where the intake valves are open, intake air from an intake manifold 67 can be taken in the combustion chambers 110. In a state where the exhaust valves are open, exhaust air from the combustion chambers 110 can be emitted to an exhaust manifold 44.

As illustrated in FIG. 3, the upper end of a pilot fuel injection valve 82 described later is disposed near the left of each head cover 40. With respect to an imaginary vertical plane P1 (see FIG. 7) including the axis 24c of the crank shaft 24, the pilot fuel injection valves 82 are inserted in the cylinder heads 26 from one side (from the left in this embodiment) of the imaginary vertical plane P1 and extend obliquely downward toward the combustion chambers 110.

In the following description, a location at one side/the other side of the imaginary vertical plane P1 including the axis 24c of the crank shaft 24 will be sometimes referred to as a location at one side/the other side of the crank shaft 24. The imaginary vertical plane P1 can be an infinite plane in both the direction of the axis 24c of the crank shaft 24 and the top-bottom direction, but FIG. 7 shows only a part of the imaginary vertical plane P1 near the engine 21 for convenience of expression in the perspective view.

As illustrated in FIGS. 2, 3, 8, a gas manifold 41 for distributing and supplying gaseous fuel to the combustion chambers 110 of the cylinders during combustion in the premixed combustion system is provided at the left of the cylinder heads 26. The gas manifold 41 extends in the front-rear direction along the left side surfaces of the cylinder heads 26. The plurality of (six in this embodiment) gas branch pipes 41a corresponding to the combustion chambers 110 of the cylinders are connected to the gas manifold 41, and as illustrated in FIG. 3, gas injectors 98 for injecting gaseous fuel are provided at the front ends of the gas branch pipes 41a. The front ends of the gas injectors 98 face intake branch pipes 67a corresponding to the cylinders and formed inside the cylinder heads 26. By injecting gaseous fuel from the gas injectors 98, the gaseous fuel can be supplied to the intake branch pipes 67a of the intake manifold 67.

As illustrated in FIGS. 3, 7, and 9, a liquid fuel supply rail pipe 42 for distributing and supplying liquid fuel to the combustion chambers 110 of the cylinders during combustion in the diffusion combustion system is disposed at the right of the cylinder block 25. The liquid fuel supply rail pipe 42 extends in the front-rear direction along the right side surface of the cylinder block 25. Liquid fuel supplied to the liquid fuel supply rail pipe 42 is distributed and supplied to fuel injection pumps 89 corresponding to the cylinders. As illustrated in FIG. 3, each cylinder is provided with a main fuel injection valve 79 that injects liquid fuel supplied from the fuel injection pump 89. The main fuel injection valves 79 are inserted in the cylinder heads 26 vertically from above the cylinder heads 26, the upper ends of the main fuel injection valves 79 are disposed inside the head covers 40, and the lower ends of the main fuel injection valves 79 face the combustion chambers 110 of the cylinders. The fuel injection pumps 89 and the main fuel injection valves 79 are connected to each other through liquid fuel supply paths 106 formed in the cylinder heads 26.

A liquid fuel return aggregate pipe 48 for collecting redundant fuel returned from the fuel injection pumps 89 is disposed near the bottom of the liquid fuel supply rail pipe 42. The liquid fuel return aggregate pipe 48 is disposed in parallel with the liquid fuel supply rail pipe 42, and connected to the fuel injection pumps 89. A fuel return pipe 115 for returning liquid fuel to the liquid fuel tank 33 is connected to an end of the liquid fuel return aggregate pipe 48.

As illustrated in FIGS. 3, 7 and 9, a pilot fuel supply rail pipe (pilot fuel supply common rail pipe) 47 for distributing and supplying pilot fuel to the combustion chambers 110 of the cylinders in order to ignite gaseous fuel during combustion in the premixed combustion system is disposed at the right of the cylinder block 25 and above the liquid fuel supply rail pipe 42. The pilot fuel supply rail pipe 47 extends in the front-rear direction along the right side surface of the cylinder block 25. As illustrated in FIGS. 3 and 7, the cylinders are provided with the pilot fuel injection valves 82 for injecting liquid fuel (pilot fuel) supplied from the pilot fuel supply rail pipe 47. The pilot fuel injection valves 82 are inserted in the cylinder heads 26 vertically from above the cylinder heads 26, the upper ends of the pilot fuel injection valves 82 are disposed immediately at the left side of the head covers 40, and the lower ends of the pilot fuel injection valves 82 face the combustion chambers 110 of the cylinders. As illustrated in FIG. 7, pilot fuel branch pipes 109 corresponding to the cylinders branch off from the pilot fuel supply rail pipe 47. The pilot fuel branch pipes 109 pass between the head covers 40 arranged side by side, and are connected to the upper ends of the pilot fuel injection valves 82. The pilot fuel branch pipes 109 are covered with a branch pipe cover 105 for preventing leaked fuel from scattering.

As illustrated in FIGS. 3, 7, and 9, a step is formed on an upper portion of the right side surface of the engine 21 constituted by the cylinder block 25 and the cylinder heads 26. The pilot fuel supply rail pipe 47, the liquid fuel supply rail pipe 42, and the fuel injection pumps 89 are disposed on this step. A side cover 43 is attached to the cylinder block 25 and the cylinder heads 26 to cover the step. The pilot fuel supply rail pipe 47, the liquid fuel supply rail pipe 42, and the fuel injection pumps 89 are covered with the side cover 43. FIG. 9 illustrates a state where a part of the side cover 43 is detached.

As illustrated in FIGS. 2, 3, and 9, the exhaust manifold 44 for collecting exhaust air generated by combustion in the combustion chambers 110 of the cylinders and emitting the exhaust air to the outside is disposed in parallel with the gas manifold 41 above the left of cylinder heads 26 and above the gas manifold 41. The outer periphery of the exhaust manifold 44 is covered with a heat shielding cover 45 (where the heat shielding cover 45 is detached in FIG. 9). As illustrated in FIG. 3, exhaust branch pipes 44a corresponding to the cylinders are connected to the exhaust manifold 44. The exhaust branch pipes 44a communicate with the combustion chambers 110 of the cylinders.

The intake manifold 67 for distributing and supplying outside air (intake air) to the combustion chambers 110 of the cylinders is disposed in parallel with the gas manifold 41 inside the cylinder block 25 and near the left of the cylinder block 25. As illustrated in FIG. 3, the six intake branch pipes 67a branching off from the intake manifold 67 are formed inside the cylinder heads 26 and communicate with the individual combustion chambers 110.

With this configuration, in combustion in the diffusion combustion system, an appropriate amount of liquid fuel is injected from the main fuel injection valves 79 into the combustion chambers 110 at an appropriate timing when air supplied to the cylinders from the intake manifold 67 is compressed by sliding of the pistons 78. Injection of liquid fuel into the combustion chambers 110 causes the pistons 78 to reciprocate in the cylinders with propulsive power obtained by combustion in the combustion chambers 110, and the reciprocating movement of the pistons 78 is converted to rotation movement of the crank shaft 24 through a rod, thereby obtaining a driving force.

On the other hand, in combustion in the premixed combustion system, gaseous fuel from the gas manifold 41 is injected from the gas injectors 98 into the intake branch pipes 67a so that air supplied from the intake manifold 67 and the gaseous fuel are mixed. At an appropriate timing when the air mixture of the air introduced into the cylinders and the gaseous fuel is compressed by sliding of the pistons 78, a small amount of pilot fuel is injected from the pilot fuel injection valves 82 into the combustion chambers 110 so that the gaseous fuel is ignited. The pistons 78 reciprocates in the cylinders with propulsive power obtained by combustion in the combustion chambers 110, and the reciprocating movement of the pistons 78 is converted to rotation movement of the crank shaft 24 through the rod, thereby obtaining a driving force.

In either case of combustion in the diffusion combustion system and combustion in the premixed combustion system, exhaust air generated by combustion is pushed out from the cylinders by movement of the pistons 78, and collected in the exhaust manifold 44, and then emitted to the outside.

As illustrated in FIG. 4, a cooling water pump 53, a lubricating oil pump 55, and a fuel high-pressure pump 56 are disposed at the front end surface (front surface) of the engine 21 and surround a front end portion of the crank shaft 24. The fuel high-pressure pump 56 is disposed near the left of the crank shaft 24. A front end portion of the engine 21 is provided with an unillustrated rotation transfer mechanism that transfers a rotative force of the crank shaft 24. Accordingly, a rotative force of the crank shaft 24 is transferred through the rotation transfer mechanism so that the cooling water pump 53, the lubricating oil pump 55, and the fuel high-pressure pump 56 provided at the outer periphery of the crank shaft 24 are thereby driven.

As illustrated in FIG. 8, a lubricating oil cooler 58 and a lubricating oil strainer 59 are attached to the left side surface of the cylinder block 25. Lubricating oil supplied from the lubricating oil pump 55 is cooled by the lubricating oil cooler 58, then purified by the lubricating oil strainer 59, and supplied to components of the engine 21.

Cooling water sent from the cooling water pump 53 illustrated in FIG. 4 cools cylinders of the engine 21, and then is collected to an over-cylinder head cooling water pipe 46 illustrated in, for example, FIG. 5.

The intercooler 51 is disposed along the front end of the engine 21, and cools air compressed by a compressor of the turbocharger 49. As illustrated in FIG. 8, a cylinder block left cooling water pipe 60 extends rearward from ahead of the cylinder block 25 along the gas manifold 41 to a position between the lubricating oil cooler 58 and the lubricating oil strainer 59, and supplies cooling water to the lubricating oil cooler 58.

As illustrated in FIGS. 5 and 9, the over-cylinder head cooling water pipe 46 is disposed in parallel with the exhaust manifold 44 and located between a plurality of head covers 40 located above the cylinder heads 26 and the exhaust manifold 44. The over-cylinder head cooling water pipe 46 is coupled to cooling water branch pipes corresponding to the cylinders, and is connected to cooling water channels of the cylinders (cooling water channels formed in the cylinder heads 26) through the cooling water branch pipes.

The fuel high-pressure pump 56 illustrated in FIG. 4 is driven to rotate to thereby increase the pressure of fuel oil (liquid fuel) supplied from the liquid fuel tank 33 illustrated in FIG. 1 through a fuel feed pump 166, and sends the fuel oil to the pilot fuel supply rail pipe 47 by way of the pilot fuel supply main pipe 107 illustrated in, for example, FIG. 7. A pilot fuel filter for filtering fuel oil is provided in an intermediate portion of a fuel path from the liquid fuel tank 33 to the fuel high-pressure pump 56.

The fuel feed pump 165 illustrated in FIG. 1 is driven by a motor so that the fuel feed pump 165 sucks fuel oil from the liquid fuel tank 33 and sends the oil to the liquid fuel supply rail pipe 42 by way of the liquid fuel supply main pipe 108 illustrated in, for example, FIG. 7. A main fuel filter for filtering fuel oil is disposed in an intermediate portion of a supply path of fuel oil from the liquid fuel tank 33 to the liquid fuel supply rail pipe 42.

As illustrated in FIG. 7, the pilot fuel supply main pipe 107, the liquid fuel supply main pipe 108, and the fuel return pipe 115 are disposed immediately ahead of the cylinder block 25 and extend along the right side surface of the cylinder block 25. The pilot fuel supply main pipe 107, the liquid fuel supply main pipe 108, and the fuel return pipe 115 extend in the top-bottom direction along the right side surface of the cylinder block 25 through a plurality of clamp members 111 projecting rightward from the front end surface of the cylinder block 25.

An engine-side operation control device 71 for performing control such as start and stopping of the engine 21 is disposed toward the right and ahead of the cylinder heads 26, more specifically, on the right side surface of the intercooler 51 with a stay interposed therebetween (see FIGS. 6 and 9). The engine-side operation control device 71 includes an operation section such as a switch that accepts start and stopping of the engine 21 by an operator, and a display that displays an operating state of the engine 21. The operator operates the engine-side operation control device 71 to thereby drive the engine 21 in one of the premixed combustion system and the diffusion combustion system.

Next, arrangement of pipes for supplying liquid fuel in the engine 21 will be described more specifically with reference to mainly FIG. 7.

The liquid fuel supply path for supplying liquid fuel to the combustion chambers 110 during combustion in the diffusion combustion system is constituted by including the liquid fuel supply main pipe 108 and the liquid fuel supply rail pipe 42, for example, as described above. The main fuel filter is provided in an intermediate portion of the liquid fuel supply main pipe 108. The main fuel filter is disposed near the right of the front end surface of the engine 21. The liquid fuel supply main pipe 108 extends in the top-bottom direction along the right side surface of the cylinder block 25 with interposition of the plurality of clamp members 111 projecting rightward from the front end surface of the cylinder block 25. The liquid fuel supply rail pipe 42 is connected to a downstream side of the liquid fuel supply main pipe 108. The liquid fuel supply rail pipe 42 is covered with the side cover 43 while extending in the front-rear direction along the right side surface of the cylinder block 25.

Liquid fuel pumped to the liquid fuel supply rail pipe 42 from the fuel feed pump 165 by way of the liquid fuel supply main pipe 108 is distributed to the fuel injection pumps 89 corresponding to the cylinders. The fuel injection pumps 89 are covered with the side cover 43. As illustrated in FIG. 3, the liquid fuel supplied to the fuel injection pumps 89 is supplied to the main fuel injection valves 79 by way of the liquid fuel supply paths 106 formed inside the cylinder heads 26.

In this manner, the liquid fuel supply path for supplying liquid fuel to the combustion chambers 110 during combustion in the diffusion combustion system is disposed at the right of the crank shaft 24 (at the right of the imaginary vertical plane P1 including the axis 24c of the crank shaft 24) as a whole. Accordingly, the operator can access the liquid fuel supply path from the right side surface of the engine 21 and performs maintenance of the liquid fuel supply main pipe 108, the liquid fuel supply rail pipe 42, and the main fuel filter, for example, at a time. In particular, the right side surface of the engine 21 is a side on which the engine-side operation control device 71 is disposed in a typical configuration, and can be easily accessed by the operator.

The pilot fuel supply path for supplying pilot fuel to the combustion chambers 110 in order to ignite gaseous fuel during combustion in the diffusion combustion system is constituted by including pilot fuel supply main pipe 107 and the pilot fuel supply rail pipe 47, for example, as described above. An upstream side of the pilot fuel supply main pipe 107 is connected to the fuel high-pressure pump 56. An upstream side of the fuel high-pressure pump 56 is connected to a fuel path, and an intermediate portion of the fuel path is provided with the pilot fuel filter. An upstream side of this fuel path is connected to the liquid fuel tank 33. The fuel high-pressure pump 56 and the pilot fuel filter are disposed near the right of the front end surface of the engine 21. The pilot fuel supply main pipe 107 extends in the top-bottom direction along the right side surface of the cylinder block 25 with interposition of the clamp members 111 used for supporting the liquid fuel supply main pipe 108. In this manner, the pilot fuel supply main pipe 107 and the liquid fuel supply main pipe 108 are supported by the common clamp members 111, and thus, the number of components can be reduced.

The pilot fuel supply rail pipe 47 is connected to a downstream side of the pilot fuel supply main pipe 107. The pilot fuel supply rail pipe 47 is covered with the side cover 43 while extending in the front-rear direction along the right side surface of the cylinder block 25.

After being filtered with the pilot fuel filter, pilot fuel pumped to the pilot fuel supply rail pipe 47 from the fuel high-pressure pump 56 by way of the pilot fuel supply main pipe 107 is distributed to the pilot fuel branch pipes 109 corresponding to the cylinders. The pilot fuel branch pipes 109 pass through space between adjacent head covers 40. Although not shown in FIG. 7, the pilot fuel branch pipes 109 are covered with the branch pipe cover 105 from above. The pilot fuel supplied to the pilot fuel branch pipes 109 is injected at an appropriate timing from the pilot fuel injection valves 82 disposed at the front end of the downstream side of the pilot fuel branch pipes 109.

In this manner, the pilot fuel supply path for supplying pilot fuel to the combustion chambers 110 during combustion in the premixed combustion system is disposed at the right of the crank shaft 24 (at the right of the imaginary vertical plane P1 including the axis 24c of the crank shaft 24) as a whole in a manner similar to the liquid fuel supply path described above (see FIG. 7). Accordingly, the operator can easily access the pilot fuel supply path from the right side surface of the engine 21 and easily perform maintenance of the pilot fuel supply main pipe 107, the pilot fuel supply rail pipe 47, the pilot fuel filter, and so forth at a time. In this manner, maintenance concerning the liquid fuel supply path (including the pilot fuel supply path) can be performed from the side surface at one side of the engine 21 at a time, and a layout that eases maintenance by the operator can be obtained.

In a conventional dual fuel engine, the pilot fuel supply rail pipe 47 is disposed not inside the side cover 43 but immediately at a side of the exhaust manifold 44 in plan view, more specifically, is exposed at a position above the exhaust branch pipes 44a of the exhaust manifold 44. The pilot fuel supply rail pipe 47 is generally long, and a joint or the like is present in the middle of the pipe. Thus, fuel can leak from this joint so that the fuel might adhere to the exhaust branch pipes 44a of the exhaust manifold 44. Since high-temperature exhaust air flows inside the exhaust manifold 44, adhesion of fuel to the exhaust branch pipes 44a at high temperature as described above or other components is not favorable.

In this regard, in this embodiment, the pilot fuel supply rail pipe 47 is disposed at a side of the crank shaft 24 opposite to the exhaust manifold 44, and is located away from the exhaust manifold 44. Accordingly, even if fuel leaks from a joint or the like of the pilot fuel supply rail pipe 47, the fuel does not adhere to the surface of the high-temperature exhaust manifold 44, and the risk of fire can be eliminated or reduced.

In addition, since the pilot fuel supply rail pipe 47 according to this embodiment is disposed inside the side cover 43, even if fuel leaks from a joint or the like of the pilot fuel supply rail pipe 47, the fuel is not spattered and maintenance of the engine 21 can be easily performed.

Figure 10:
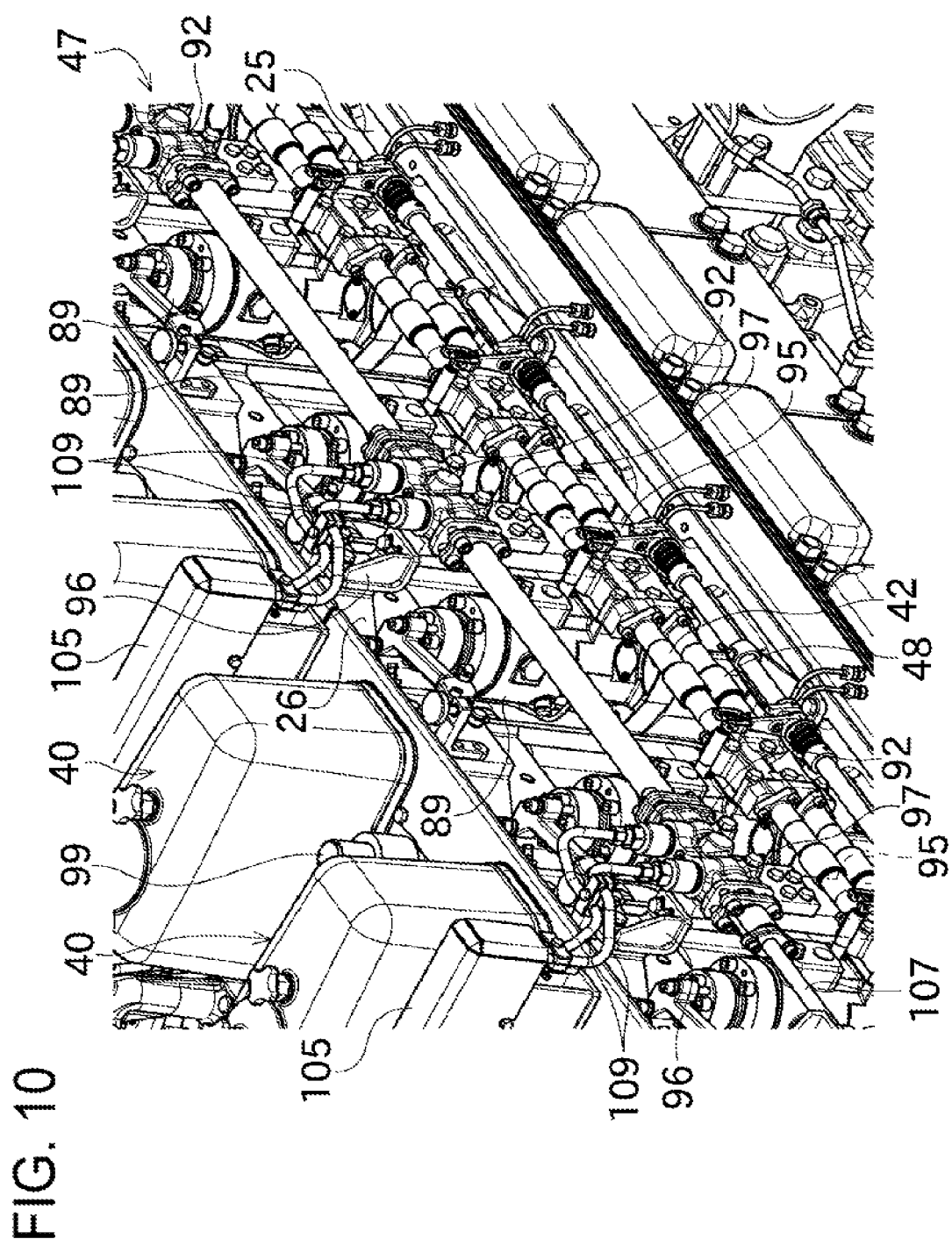
FIG. 10 An enlarged perspective view of the engine illustrating a state in which the side cover is detached.

Next, a configuration for supporting the liquid fuel supply rail pipe 42 will be described with reference to FIG. 10. FIG. 10 is an enlarged perspective view of the engine 21 illustrating a state where the side cover 43 is detached.

As illustrated in FIG. 10, the liquid fuel supply rail pipe 42 includes branching joints 92 disposed at a longitudinally intermediate portion thereof. One branching joint 92 is provided for two cylinders, and two pilot fuel branch pipes 109 are connected to an upper portion of each branching joint 92.

As described above, the step is formed on the cylinder block 25 and the cylinder heads 26, and lower stays 95 each having a flat plate shape are fixed to the cylinder block 25 to project upward from the bottom surface of this step. L-shaped upper stays 96 are fixed to the cylinder heads 26 to project sideways from a side wall of the step. The lower stays 95 and the upper stays 96 are fixed to the cylinder block 25 or the cylinder heads 26 through bolts and nuts.

Intermediate stays 97 each having a flat plate shape are disposed to connect the lower stays 95 and the upper stays 96 to each other. Lower portions of the intermediate stays 97 are fixed to the lower stays 95, and upper portions of the intermediate stays 97 are fixed to the upper stays 96. The branching joints 92 are fixed to the intermediate stays 97. These fixings are achieved through bolts and nuts.

In the manner described above, the pilot fuel supply rail pipe 47 is supported using the lower stays 95 and the upper stays 96 from above and below (i.e., from both the cylinder block 25 and the cylinder heads 26). Accordingly, rigidity of the support structure can be enhanced, and thus, and vibrations of the pilot fuel supply rail pipe 47 can be reduced.

As described above, the engine 21 according to this embodiment is operable in the premixed combustion system in which gaseous fuel mixed with air is caused to flow into the combustion chambers 110 and the diffusion combustion system that injects liquid fuel into the combustion chambers 110 for combustion. The engine 21 includes the main fuel injection valves 79, the pilot fuel injection valves 82, the liquid fuel supply rail pipe 42, and the pilot fuel supply rail pipe 47. The main fuel injection valves 79 supplies liquid fuel to the combustion chambers 110 during combustion in the diffusion combustion system. The pilot fuel injection valves 82 supply pilot fuel to the combustion chambers 110 in order to ignite gaseous fuel during combustion in the premixed combustion system. The liquid fuel supply rail pipe 42 is disposed at one side (right side) of the imaginary vertical plane P1 including the crank shaft 24 of the engine 21 and supplies liquid fuel to the main fuel injection valves

79. The pilot fuel supply rail pipe 47 is disposed as the same side of the imaginary vertical plane P1 as the liquid fuel supply rail pipe 42, and supplies pilot fuel to the pilot fuel injection valves 82.

Accordingly, maintenance of the liquid fuel supply rail pipe 42 and maintenance of the pilot fuel supply rail pipe 47 can be performed from one side (from the right side surface in this embodiment) of the crank shaft 24 of the engine 21, and thus, maintenance can be performed easily.

The engine 21 according to this embodiment further includes the exhaust manifold 44 that is disposed at the side (left side) of the imaginary vertical plane P1 opposite to the liquid fuel supply rail pipe 42, collects exhaust air generated by combustion in the combustion chambers 110, and emits the air to the outside.

Accordingly, the exhaust manifold 44 is disposed at the side of the crank shaft 24 opposite to the side at which the liquid fuel supply rail pipe 42 and the pilot fuel supply rail pipe 47 are disposed. Accordingly, it is possible to prevent or reduce an adverse effect on performance of the engine by fuel yet to be supplied to the combustion chambers 110 at high temperature under the influence of exhaust air flowing in the exhaust manifold 44.

The engine 21 according to this embodiment further includes the fuel injection pumps 89 and the side cover 43 serving as a covering member. The fuel injection pumps 89 are disposed at the same side (right side) of the imaginary vertical plane P1 as the liquid fuel supply rail pipe 42, and supplies fuel to the main fuel injection valves 79. The side cover 43 covers the liquid fuel supply rail pipe 42, the pilot fuel supply rail pipe 47, and the fuel injection pumps 89.

Accordingly, even if fuel leaks from one of the liquid fuel supply rail pipe 42, the pilot fuel supply rail pipe 47, and the fuel injection pumps 89, scattering of fuel can be prevented or reduced, and thus, maintainability and safety can be enhanced.

The foregoing description is directed to the preferred embodiment of the present invention, and the configuration described above may be changed, for example, as follows.

In the embodiment described above, the engine 21 is used as a driving source of a propulsive and power generating mechanism of a ship, but this is not restrictive, and the engine 21 may be a driving source used for other purposes.

In the embodiment described above, the liquid fuel supply rail pipe 42, the pilot fuel supply rail pipe 47, and the fuel injection pumps 89 are disposed along the right side surface of the engine 21, but this is not restrictive. Alternatively, the liquid fuel supply rail pipe 42, the pilot fuel supply rail pipe 47, and the fuel injection pumps 89 may be disposed along the left side surface of the engine 21.

REFERENCE SIGNS LIST

21 engine
24 crank shaft
42 liquid fuel supply rail pipe
43 side cover (covering member)
44 exhaust manifold
heat shielding cover
47 pilot fuel supply rail pipe
79 main fuel injection valve
82 pilot fuel injection valve
89 fuel injection pump
110 combustion chamber
P1 imaginary vertical plane

What is claimed is:

1. An engine operable in a premixed combustion system in which gaseous fuel mixed with air is caused to flow into a combustion chamber and a diffusion combustion system that injects liquid fuel into the combustion chamber for combustion, the engine comprising:
   a main fuel injection valve configured to supply liquid fuel to the combustion chamber during combustion in the diffusion combustion system;
   a pilot fuel injection valve configured to supply pilot fuel to the combustion chamber in order to ignite gaseous fuel during combustion in the premixed combustion system;
   a liquid fuel supply rail pipe that is configured to supply liquid fuel to the main fuel injection valve;
   a pilot fuel supply rail pipe that is configured to supply pilot fuel to the pilot fuel injection valve; and
   an exhaust manifold that collects exhaust air generated by combustion in the combustion chamber and discharges the air to outside,
   wherein the liquid fuel supply rail pipe is disposed at a first side of an imaginary vertical plane including a crank shaft of the engine; and
   the pilot fuel supply rail pipe is disposed at the first side of the imaginary vertical plane at which the liquid fuel supply rail pipe is disposed.

2. The engine according to claim 1, further comprising:
   a fuel injection pump that is configured to supply liquid fuel from the liquid fuel supply rail pipe to the main fuel injection valve,
   wherein the liquid fuel supply rail pipe and the pilot fuel supply rail pipe are provided at positions overlapping with the fuel injection pump in a side view of the engine.

3. The engine according to claim 1, further comprising:
   a covering member that covers the liquid fuel supply rail pipe and the pilot fuel supply rail pipe.

* * * * *